US 11,951,820 B2

(12) United States Patent
Wimmer

(10) Patent No.: US 11,951,820 B2
(45) Date of Patent: Apr. 9, 2024

(54) OPENABLE VEHICLE ROOF HAVING A WIND DEFLECTOR DEVICE

(71) Applicant: Webasto SE, Stockdorf (DE)

(72) Inventor: Rudolf Wimmer, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 338 days.

(21) Appl. No.: 17/270,547

(22) PCT Filed: Sep. 12, 2019

(86) PCT No.: PCT/EP2019/074343
§ 371 (c)(1),
(2) Date: Feb. 23, 2021

(87) PCT Pub. No.: WO2020/069834
PCT Pub. Date: Apr. 9, 2020

(65) Prior Publication Data
US 2021/0213815 A1 Jul. 15, 2021

(30) Foreign Application Priority Data
Oct. 5, 2018 (DE) .......................... 102018007851.6

(51) Int. Cl.
B60J 7/22 (2006.01)
B29C 45/44 (2006.01)
(Continued)

(52) U.S. Cl.
CPC ............. *B60J 7/22* (2013.01); *B29C 45/4435* (2013.01); *B29C 2045/1707* (2013.01); *B29L 2031/3005* (2013.01)

(58) Field of Classification Search
CPC .. B60J 7/22; B60J 7/043; B60J 7/0435; B60R 13/04
(Continued)

(56) References Cited

U.S. PATENT DOCUMENTS 5,018,782 A * 5/1991 Fiegel ...................... B60J 7/22
296/180.5
2008/0246306 A1 10/2008 Oerke et al.
(Continued)

FOREIGN PATENT DOCUMENTS

CN 104428150 A 3/2015
CN 104972877 A 10/2015
(Continued)

OTHER PUBLICATIONS

Leuchs et al., "Wind deflector for motor vehicle to deflect drive air flow from roof area, has base unit for stationary fixing of wind deflector in roof of motor vehicle, where draw unit is formed in bow-shape", Published: Jul. 10, 2014, Publisher: German Patent Office, Edition: DE-102013000073-A1 (Year: 2014).*
(Continued)

*Primary Examiner* — Dennis H Pedder
(74) *Attorney, Agent, or Firm* — Fitch, Even, Tabin & Flannery, LLP

(57) ABSTRACT

An openable vehicle roof having a wind deflector device which contains a wind deflector bow, which is produced from plastic material and has a central wind deflector profiled element having lateral deployment arms. At least the wind deflector profiled element has a profile leg, which delimits a groove, which is formed on the wind deflector profiled element and is open at the bottom and runs longitudinally, and the profile leg has, on the interior thereof facing the groove, a molded-on or attached fastening apparatus for an add-on part. A tool for producing a wind deflector bow is provided.

8 Claims, 11 Drawing Sheets

(51) Int. Cl.
  *B29C 45/17* (2006.01)
  *B29L 31/30* (2006.01)
(58) Field of Classification Search
  USPC .......................................................... 296/217
  See application file for complete search history.

(56) References Cited

U.S. PATENT DOCUMENTS

| | | |
|---|---|---|
| 2011/0260505 A1 | 10/2011 | Rooijakkers |
| 2013/0193721 A1 | 8/2013 | Wimmer |
| 2015/0108794 A1 | 4/2015 | Hölzel |
| 2015/0284037 A1 | 10/2015 | Kukula et al. |

FOREIGN PATENT DOCUMENTS

| | | | |
|---|---|---|---|
| CN | 106808986 A | 6/2017 | |
| DE | 19750978 A1 | 4/1998 | |
| DE | 102004023682 A1 | 12/2005 | |
| DE | 102005054186 A1 | 5/2007 | |
| DE | 102005063099 A1 | 7/2007 | |
| DE | 102008034491 A1 | 2/2010 | |
| DE | 102009041291 A1 | 5/2011 | |
| DE | 102010048964 A1 | 4/2012 | |
| DE | 102013000073 A1 * | 7/2014 | ............ B60J 7/22 |
| EP | 2684720 A1 | 1/2014 | |

OTHER PUBLICATIONS

International Search Report for PCT/EP2019/074343 dated Dec. 13, 2019 in English and German (5 pages).
First Office Action issued against corresponding DE Patent Application No. 102018007851.6 dated May 13, 2019 in German (5 pages).
Chinese Office Action of corresponding CN Application No. 201980047813.7 dated Sep. 6, 2023, in Chinese with English Machine Translation (14 pages). References not provided here were cited in previous IDS.

* cited by examiner

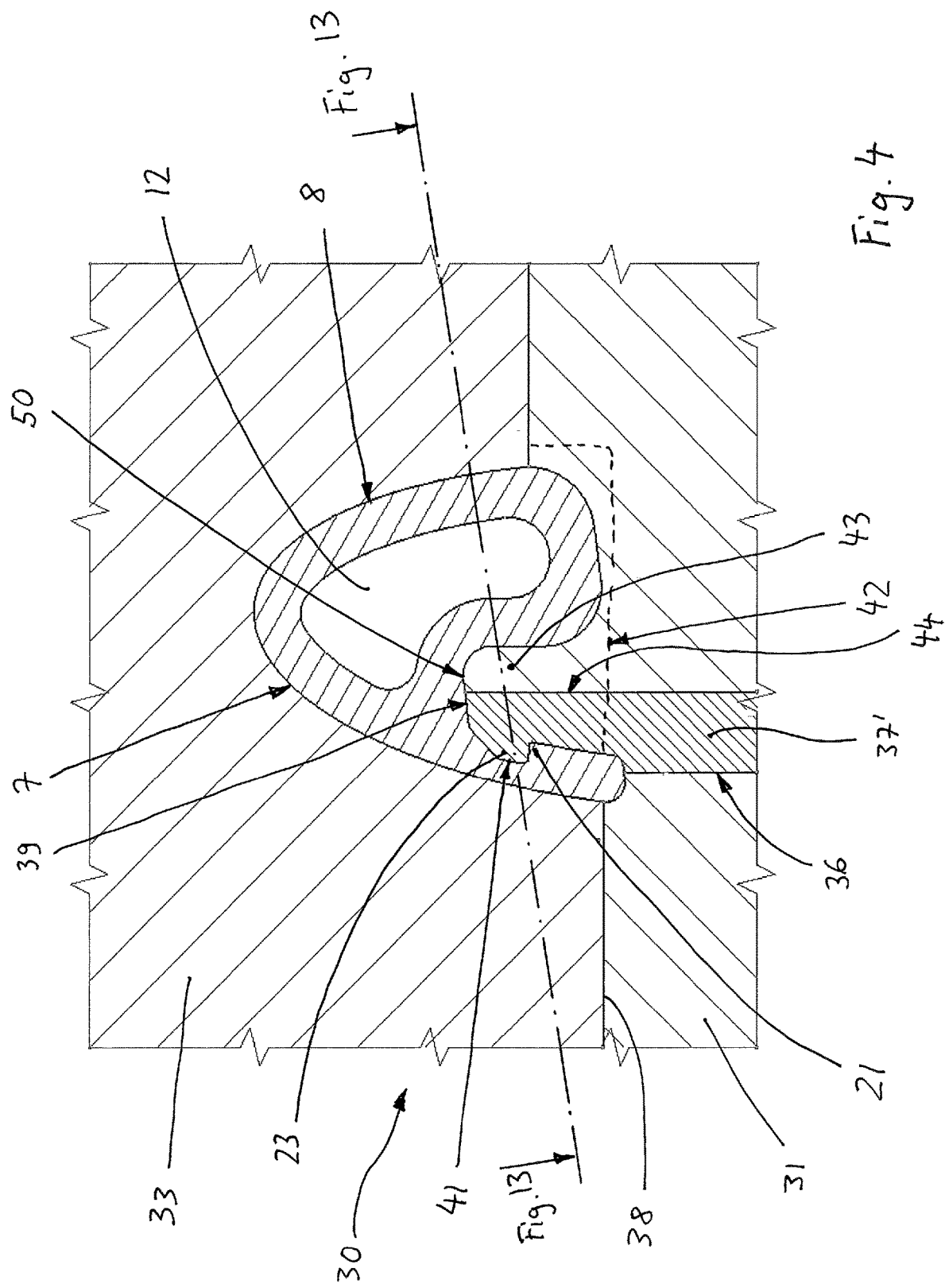

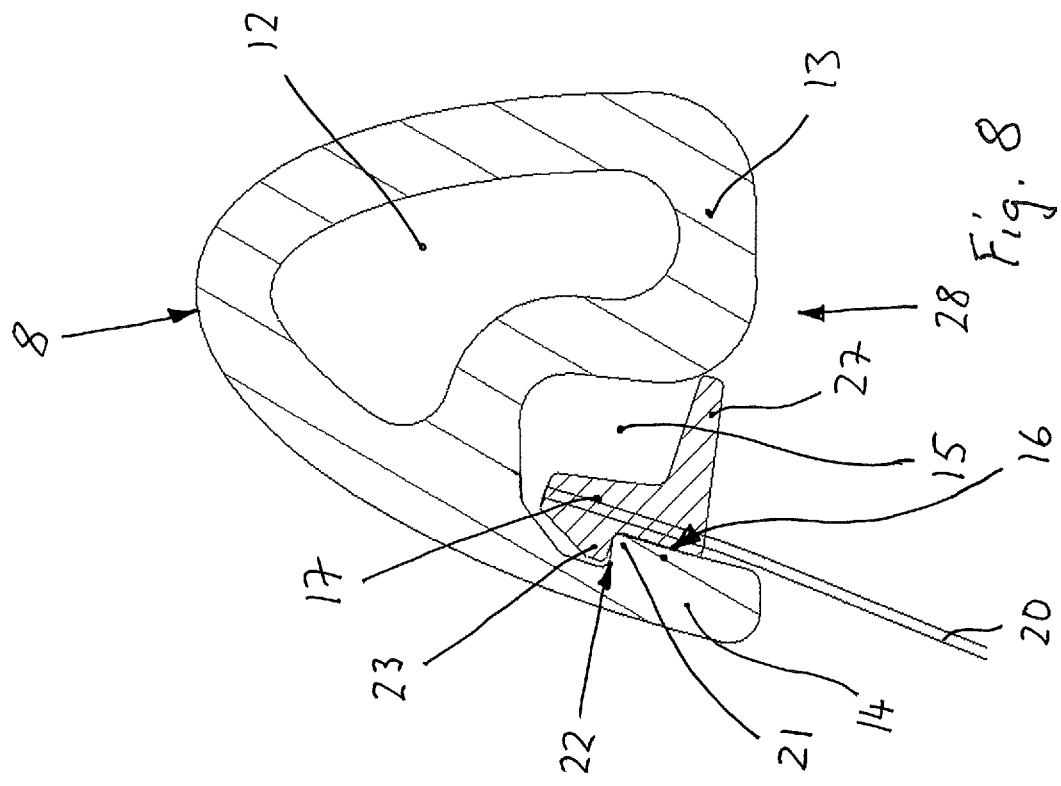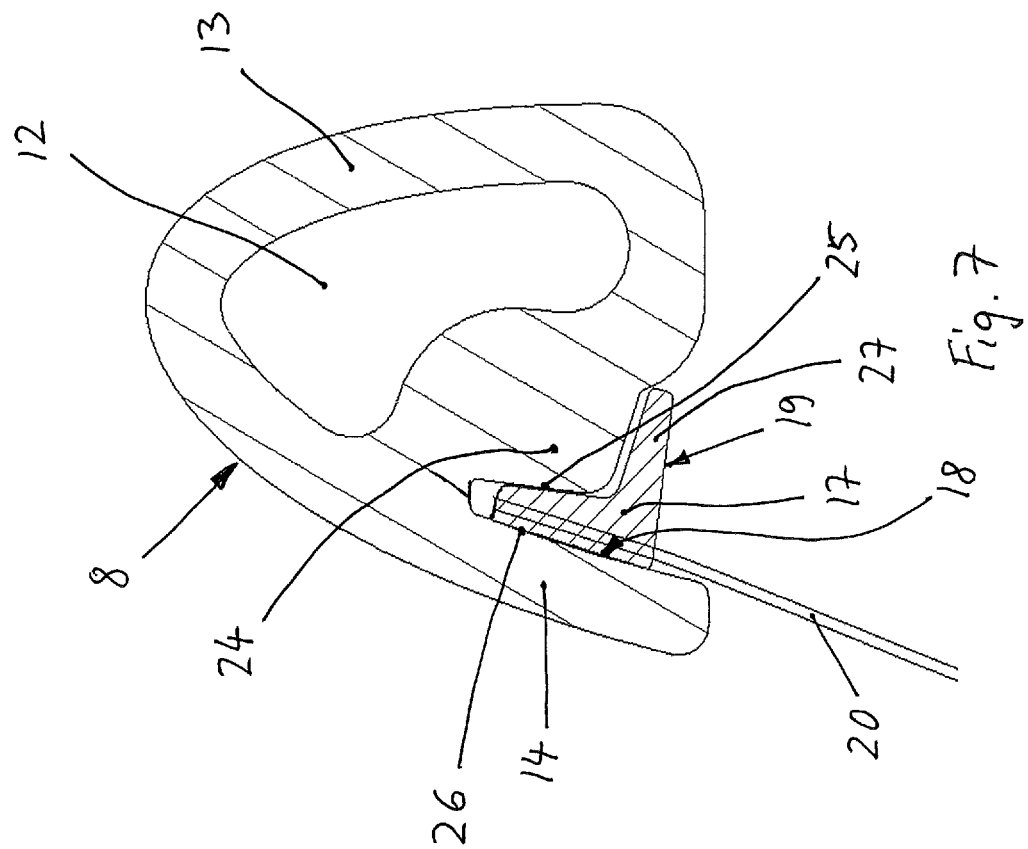

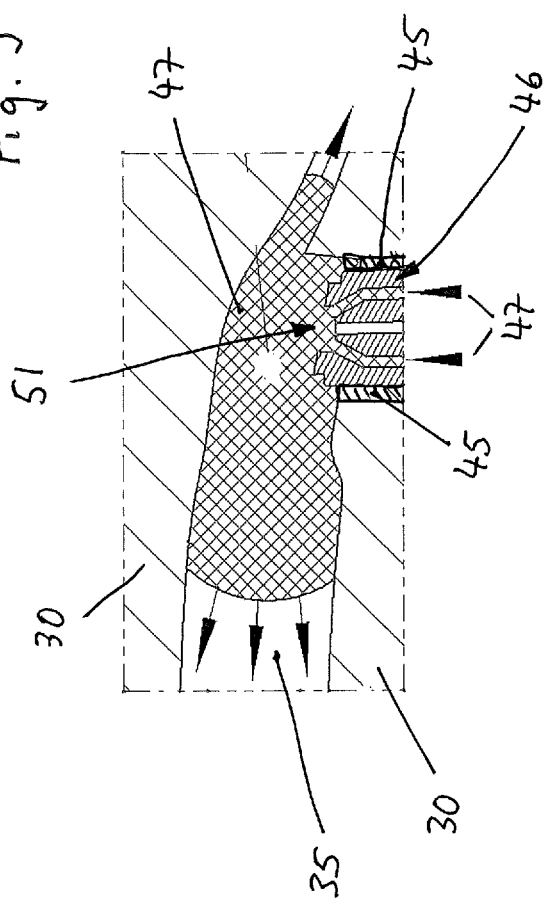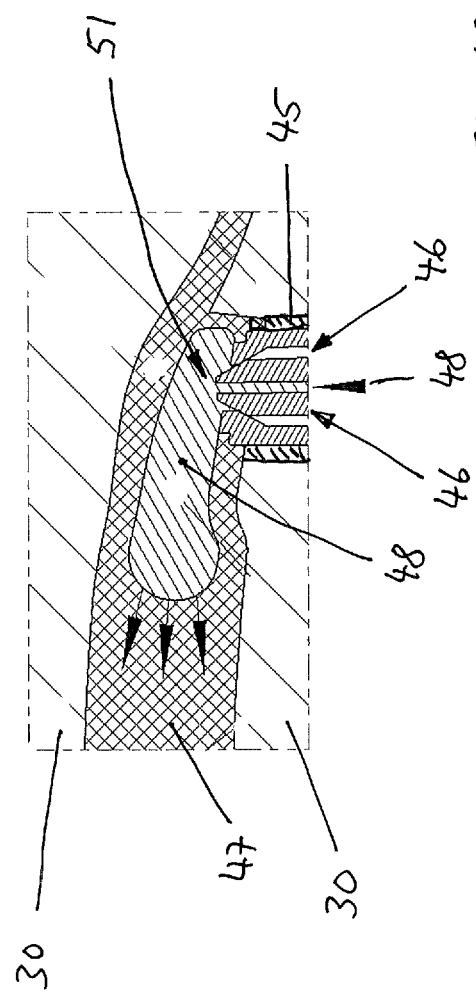

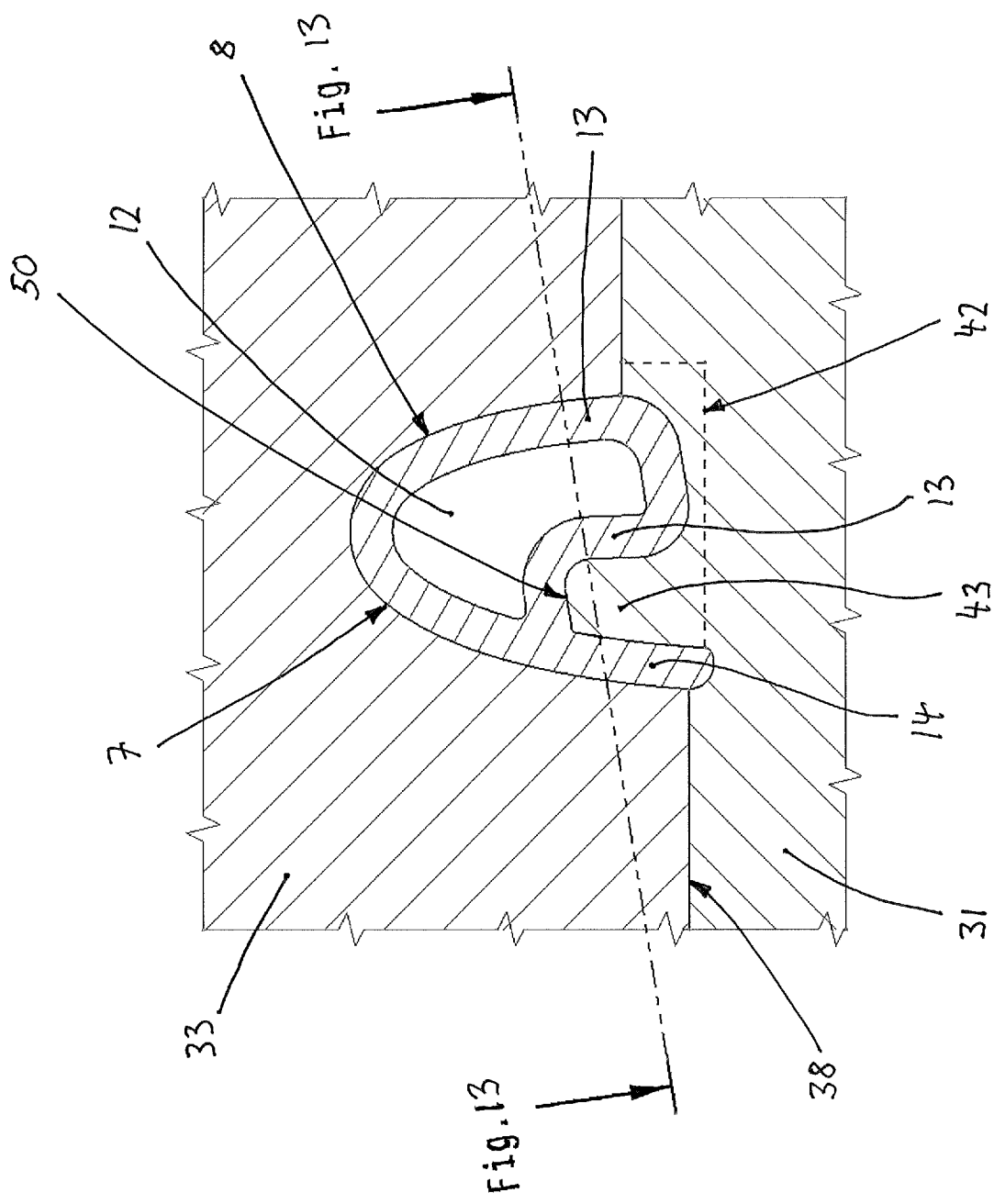

OPENABLE VEHICLE ROOF HAVING A WIND DEFLECTOR DEVICE

CROSS-REFERENCE TO RELATED APPLICATIONS

This application is a U.S. national phase application filed under 35 U.S.C. § 371 of International Application No. No. PCT/EP2019/074343, filed 12 Sep. 2019, designating the United States, which claims priority from German Patent Application No. 10 2018 007 851.6, filed 5 Oct. 2018, which are hereby incorporated herein by reference in their entirety for all purposes.

FIELD

The invention relates to an openable vehicle roof comprising a wind deflector device, which contains a wind deflector bow, which is produced from plastic material and has a central wind deflector profiled element having lateral deployment arms, as well as a tool for producing a wind deflector bow of a wind deflector device of an openable vehicle roof by means of plastic injection-molding or plastic foaming in a mold cavity between two mold plates, wherein at least one ejector channel is provided in the one mold plate with an ejector received or mounted therein.

BACKGROUND

A wind deflector device having a wind deflector bow has been disclosed in DE 10 2005 063 099 A1. A central wind deflector profiled element has an upwardly open groove, an add-on part holding a wind deflector mesh being inserted therein and being held by means of projections of a fastening apparatus. The arrangement and fastening of the add-on part is located in the flow region of the wind deflector profiled element so that provisions have to be made in order to avoid undesired noise generation due to air turbulence.

SUMMARY

The object of the invention is to provide a vehicle roof as mentioned in the introduction which is improved regarding the design of the wind deflector bow, as well as a tool for producing a wind deflector bow.

The object is achieved in the vehicle roof according to the invention as mentioned in the introduction in that at least the wind deflector profiled element has a profile leg, which delimits a groove, which is formed on the wind deflector profiled element and is open at the bottom and runs longitudinally, and that the profile leg has, on the interior thereof facing the groove, a molded-on or attached fastening apparatus for an add-on part. The object is further achieved in the tool according to the invention as mentioned in the introduction in that the mold cavity is provided for molding at least one central wind deflector profiled element of the wind deflector bow and in that the ejector, when the tool is closed, is received in a recess of a mold web of the mold plate bearing the ejector and with its front face is arranged flush with a mold web front surface which forms a groove base of a groove to be formed on the wind deflector profiled element.

Advantageous embodiments of the invention are specified in the dependent claims.

The wind deflector bow according to the invention is thus characterized in that it is designed for the attachment of an add-on part on the lower face. Such an add-on part is thus arranged outside the inflow side of the wind deflector profiled element. The fastening apparatus which is molded-on or attached to the interior of the profile leg is substantially protected in the groove and concealed or covered from being viewed by a person seated in the vehicle.

In a preferred embodiment, the fastening apparatus has at least one fastening element for forming an undercut engagement with the add-on part. The undercut engagement may be formed, for example, as a latched fastening or snap fastening. The fastening element may be formed as a tooth or as a hook or the like. The fastening element for forming the undercut engagement may also be formed in the manner of a groove with a narrow slot opening and a receiving space which widens behind the slot opening for a fastening portion of the add-on part.

The profile leg is expediently arranged on the wind deflector profiled element on the front face or air-conducting face so that it delimits the groove on the front face. However, the profile leg may also be arranged on the wind deflector profiled element on the rear face relative to the direction of flow or on the lower face of the wind deflector profiled element.

According to a preferred embodiment, it is provided that the wind deflector profiled element is formed as a hollow chamber profile with the profile leg molded thereon. Preferably, the wind deflector profiled element is produced in a gas-assisted injection-molding method or in a water-assisted injection-molding technique. Such a hollow chamber profile has a high level of strength due to its one-piece design. Further reinforcing parts to be additionally mounted on the wind deflector profiled element are not necessary. Thus a substantially closed and smooth surface of the wind deflector profiled element may be achieved.

It is particularly preferred if each of the two lateral deployment arms has a sprue region. During injection-molding the plastic material is injected via the sprue region into a cavity or a mold cavity of the injection mold. The sprue region is that point on the deployment arm at which after separating the plastic sprue from the deployment arm a so-called sprue mark is visible at the separation point. Otherwise the wind deflector bow expediently has no further sprue regions, in particular not on the wind deflector profiled element. Thus, when pivoted out into the operating position, the visual appearance of the wind deflector bow for a person seated in the vehicle and viewing the wind deflector bow through the open roof is not impaired by such sprue marks, the surfaces thereof also being able to be more easily contaminated.

A plurality of webs for fixing an add-on part, which is to be attached or is attached to the fastening apparatus, are expediently formed in the groove or on the groove base. The webs protrude, for example, in the form of lugs or the like from the wall of the wind deflector profiled element into the groove and press the inserted add-on part into its fixed position. The fastening apparatus preferably comprises hook portions which, with latching lugs of the add-on part, form undercutting engagements or undercut engagements for fixing the add-on part. However, the fastening apparatus may also have other fastening elements, such as clips or the like.

Preferably hook portions are formed alternately with webs on the wind deflector profiled element. It is preferred that when inserting or pushing the add-on part into the groove the latching lugs push the resiliently flexing profile legs outwardly in order to widen the groove temporarily so that the add-on part may adopt with its latching lugs the installed position thereof. The spacing of two webs from the hook portion arranged therebetween is able to be set as a function of the elastic deformability of the profile leg. In the case of greater elastic deformability or a more flexible plastic material of the profile leg, the two webs may be arranged relatively close to the hook portion.

The add-on part is, for example, a wind deflector element or a wind deflector mesh with an elongated continuous or interrupted holding element which is to be inserted into the groove. The add-on part is expediently a weatherstrip which is molded onto a wind deflector element or a wind deflector mesh as a retaining element.

Expediently the add-on part also represents a covering or a panel for the groove. As a result, both a streamlined design and an improved visual appearance of the lower face of the pivoted-out wind deflector bow is provided.

A tool according to the invention is characterized in that each ejector bears only against the groove of the wind deflector profiled element formed in the closed tool, in particular only against the groove base or additionally against a groove side wall or groove internal wall. In any case, the contact point of the ejector on the wind deflector profiled element is located at a recessed and barely visible point.

Expediently the ejector is mounted in an ejector channel which is arranged perpendicular to the parting plane of the two mold plates. The ejector which is guided perpendicularly permits an optimized assignment of the ejector to the downwardly open groove of the wind deflector profiled element.

The tool is expediently configured for performing a gas-assisted injection-molding method or a water-assisted injection-molding technique during the injection-molding of the wind deflector bow.

It is particularly preferred if the sprue openings, which are arranged in the tool for supplying plastic molding material into the mold cavity, open into the mold cavity on the lower face of the lateral deployment arms of the wind deflector bow to be formed and if, in particular, the sprue openings exclusively adopt these positions and the region for molding the central wind deflector profiled element is free of such sprue openings. Any opening, in particular, which opens directly into the mold cavity is denoted as a sprue opening, the plastic molding material being supplied thereby into the mold cavity.

Expediently an injection needle is provided at each sprue opening, both plastic molding material as melt and a pressure medium being able to be injected thereby. Thus only one injection needle is required at a sprue opening for the supply of melt and pressure medium, whereby the tool is simplified.

Expediently some of the ejectors are resilient ejectors. The resilient ejectors are suitable, in particular, for use in the hooking-behind of the fastening apparatus. Thus, when the tool is opened, the ejector engaging behind the hook portion on the wind deflector profiled element is able to pivot out from the wind deflector profiled element or the wind deflector bow.

Expediently the tool is provided and formed for producing a wind deflector bow as disclosed above.

BRIEF DESCRIPTIONS OF THE DRAWINGS

The invention is described in more detail hereinafter using an exemplary embodiment of a wind deflector bow according to the invention as well as a tool for the production thereof with reference to the drawings, in which:

FIG. 4 shows in a cross-sectional view in a section of the injection-molding tool offset in parallel to the view of FIG. 3;

FIG. 7 shows in a cross-sectional view the wind deflector bow with a weatherstrip secured thereto and holding a wind deflector mesh;

FIG. 8 shows in a cross-sectional view in a section offset in parallel to the view of FIG. 7 the wind deflector bow with the weatherstrip comprising a latching lug;

FIG. 9 shows in a cross-sectional view a detail of the injection-molding tool on a sprue in the mold cavity during the injection-molding of the melt;

FIG. 10 shows in a cross-sectional view according to FIG. 9 the detail of the injection-molding tool during the injection-molding of the molding medium;

FIG. 11 shows in a cross-sectional view according to a further cutting plane shown in FIG. 13 the injection-molding tool with the wind deflector bow molded therein;

DETAILED DESCRIPTION

Figure 14:
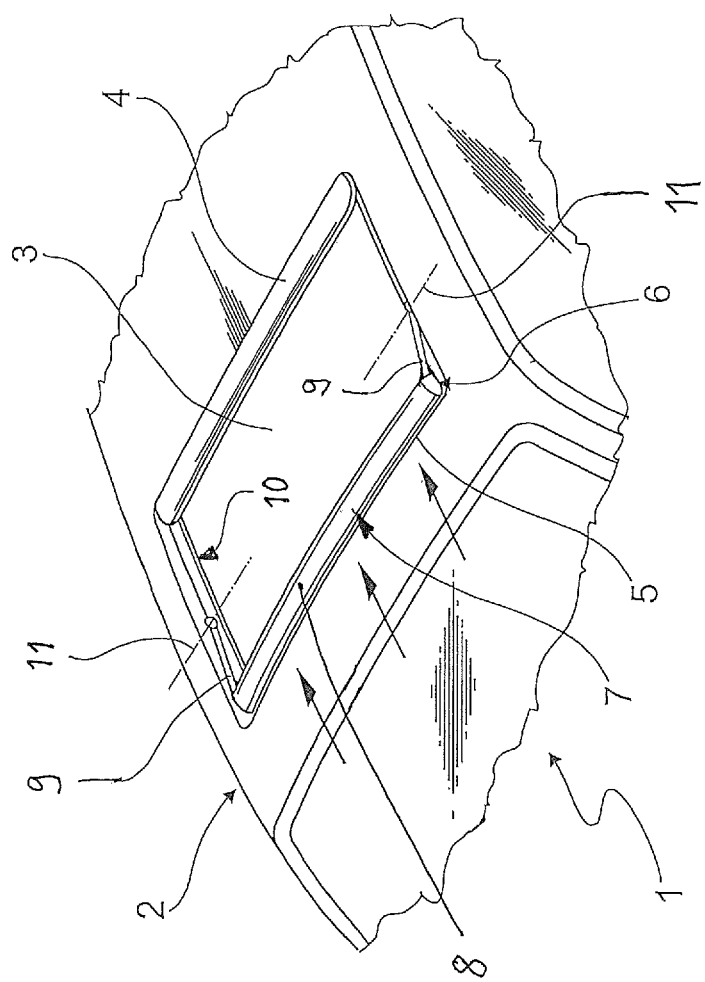
FIG. 14 shows in a perspective view a vehicle with an open vehicle roof and an extended wind deflector.

A vehicle 1, such as for example a passenger motor vehicle, (see FIG. 14) contains a vehicle roof 2 with a roof opening 3 and a cover 4, for example of a sliding roof, sliding-tilting roof or externally guided sliding roof, which is adjustable in the known manner between a closed position closing the roof opening 3 and an open position releasing the roof opening 3 and into intermediate positions. A wind deflector device 6 (shown by way of example in FIG. 11) assigned to a front edge 5 of the roof opening 3 contains a wind deflector bow 7 with a central wind deflector profiled element 8 and lateral deployment arms 9. The deployment arms 9 are pivotably mounted at their rear ends on a roof frame 10 laterally delimiting the roof opening 3, about a fixed or displaceable transverse pivot axis 11.

The wind deflector bow 7 (see FIGS. 7 and 8) is injection-molded from a plastic material. The wind deflector profiled element 8 is formed as a hollow chamber profile with a profile wall 13 surrounding a hollow chamber 12. The wind deflector profiled element 8 has a profile leg 14 on the front face or air-conducting face, said profile leg delimiting on the front face a groove 15 formed on the wind deflector profiled element 8. The groove 15 is open at the bottom and runs longitudinally along the wind deflector profiled element 8. A fastening apparatus 16 for an add-on part 17 is arranged or molded onto the wind deflector profiled element 8 and, in particular, onto the profile leg 14. Expediently the fastening apparatus 16 is substantially arranged or formed on the interior 18 of the profile leg 14 facing the groove 15.

The add-on part 17 is, for example, a weatherstrip 19 with a wind deflector mesh 20. The weatherstrip 19 is, for example, molded-on or injection-molded to an edge of the wind deflector mesh 20.

The fastening apparatus 16 has a plurality of fastening elements which are formed as undercuts or hook portions 21, which are arranged over the length of the wind deflector profiled element 8, which are oriented toward the groove 15 and which in each case provide an undercut engagement 22 for fastening a latching lug 23 of the add-on part 17 to the hook portion 21. The hook portions 21 and the latching lugs 23 are formed in each case so as to be assigned to one another on the profile leg 14 and/or the add-on part 17 and extend as short or longer portions in the longitudinal direction of the wind deflector profiled element 8 between webs 24 which are formed spaced apart from one another on the profile wall 13 and opposing the profile leg 14. The webs 24 protrude into the groove 15 and in each case have a contact edge 25 on the front face which brings the add-on part 17, which is inserted into the groove 15, into contact with the profile leg 14. Thus each latching lug 23, which in each case is located between two webs 24, is also held in its latched position in an undercut engagement 22. When inserting or pushing the add-on part 17 into the groove 15 the latching lugs 23 push the resiliently flexing profile leg 14 outwardly in order to widen the groove 15 temporarily so that the add-on part 17 may adopt with its latching lugs 23 the installed position thereof. Between the latching lugs 23 the add-on part 17 also bears flat against an assigned bearing surface 26 on the interior 18 of the profile leg 14. The spacing between two webs 24 from the hook portion 21 (see FIG. 13) arranged therebetween is set as a function of the elastic deformability of the profile leg 14. In the case of greater elastic deformability or a more flexible plastic material of the profile leg 14, the two webs 24 may be arranged relatively close to the hook portion 21.

The add-on part 17 has a base leg 27 on the lower face which covers the groove 15 and the webs 24, in particular substantially flush with the adjacent profile wall 13 on the lower face 28 of the wind deflector profiled element 8 and expediently also with the profile leg 14. The lower face 28 of the wind deflector profiled element 8 with the add-on part 17 or weatherstrip 19 fastened thereto thus has a substantially uniform visual appearance, in particular for a person seated in the vehicle and viewing the wind deflector bow 7 through the open roof. The substantially smooth design of the lower face 28 of the wind deflector bow 7, at least in the portion of the wind deflector profiled element 8, is less susceptible to soiling and disturbing noise generation in the extended operating mode.

Figure 1:
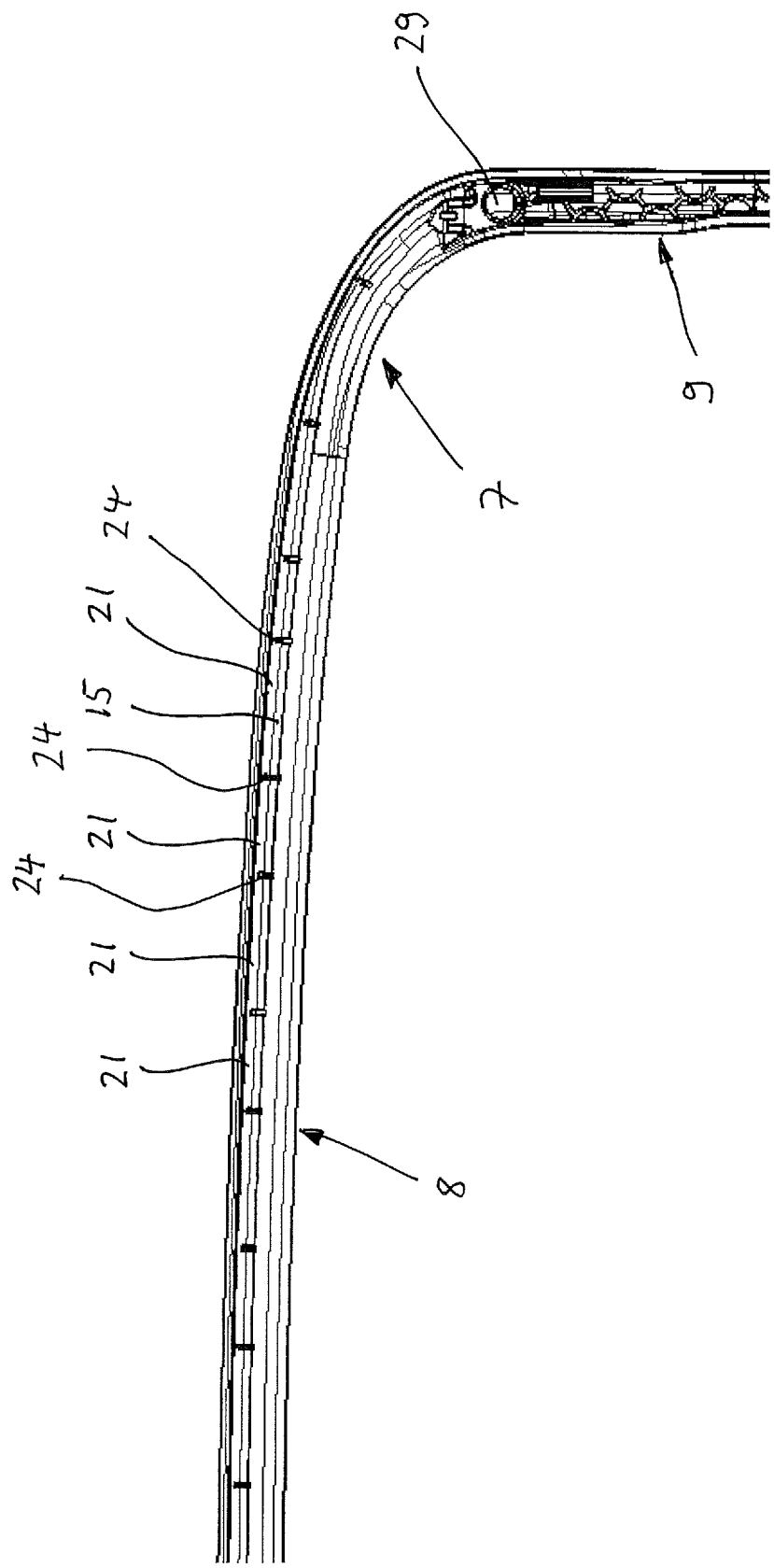
FIG. 1 shows in a view from below a portion of a wind deflector bow in the region of its left-hand half.
Figure 2:
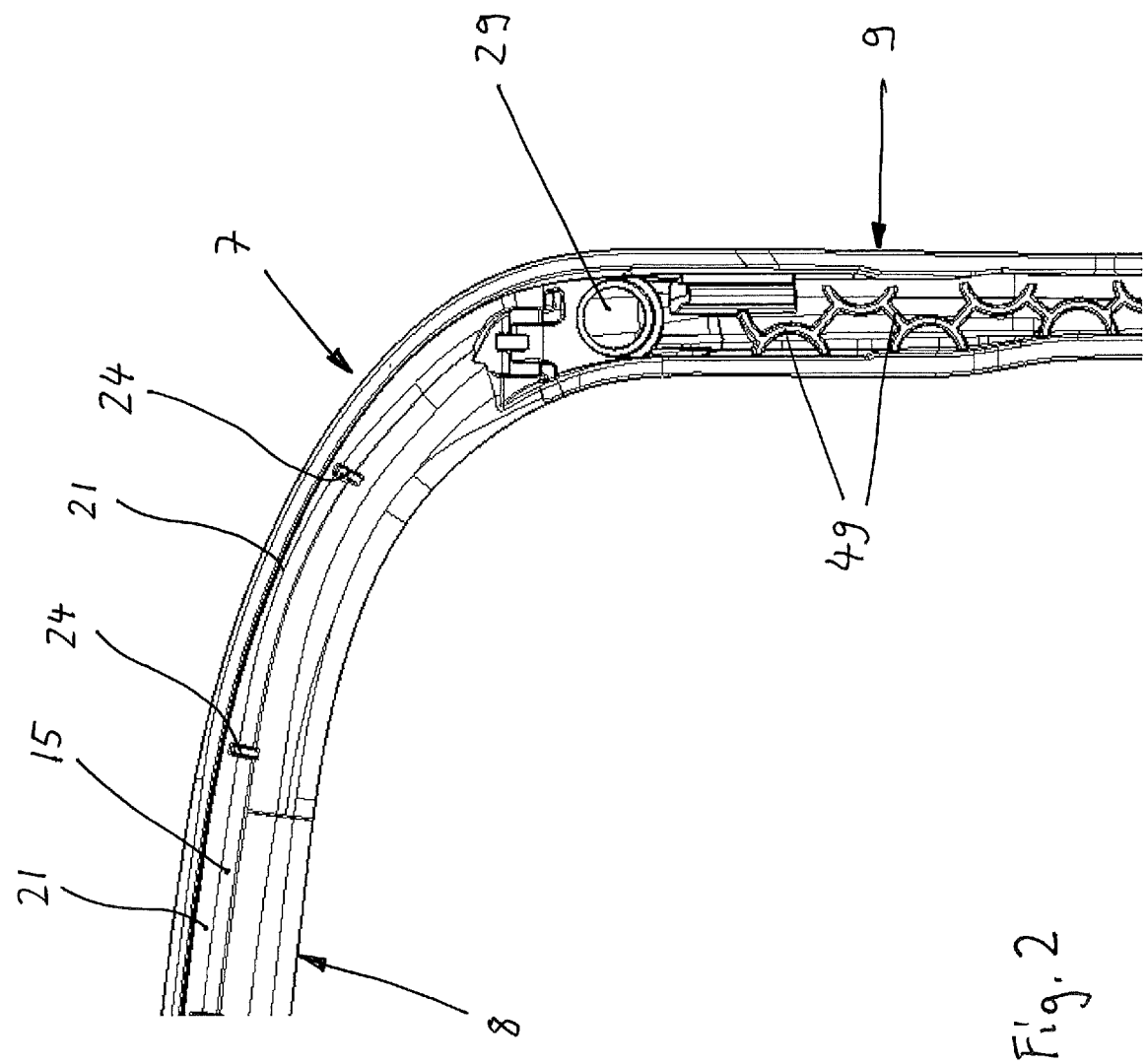
FIG. 2 shows in a view from below a corner portion of the wind deflector bow shown in FIG. 1 in an enlarged view.

This design of the central wind deflector profiled element 8 may also extend into the expediently rounded corner region of the wind deflector bow 7 at the transition with the respective deployment arm 9 and optionally also into the deployment arm 9 (see FIG. 2).

Each deployment arm 9 has on its lower face a sprue region 29 at which during injection-molding the plastic material is injected into a cavity or a mold cavity of the injection mold. Otherwise the wind deflector bow 7 has no further sprue regions, in particular not on the wind deflector profiled element 8. The sprue region 29 is that point on the deployment arm 9 where, after the separation of the plastic sprue from the deployment arm 9, a so-called sprue mark is visible at the separation point.

Figure 3:
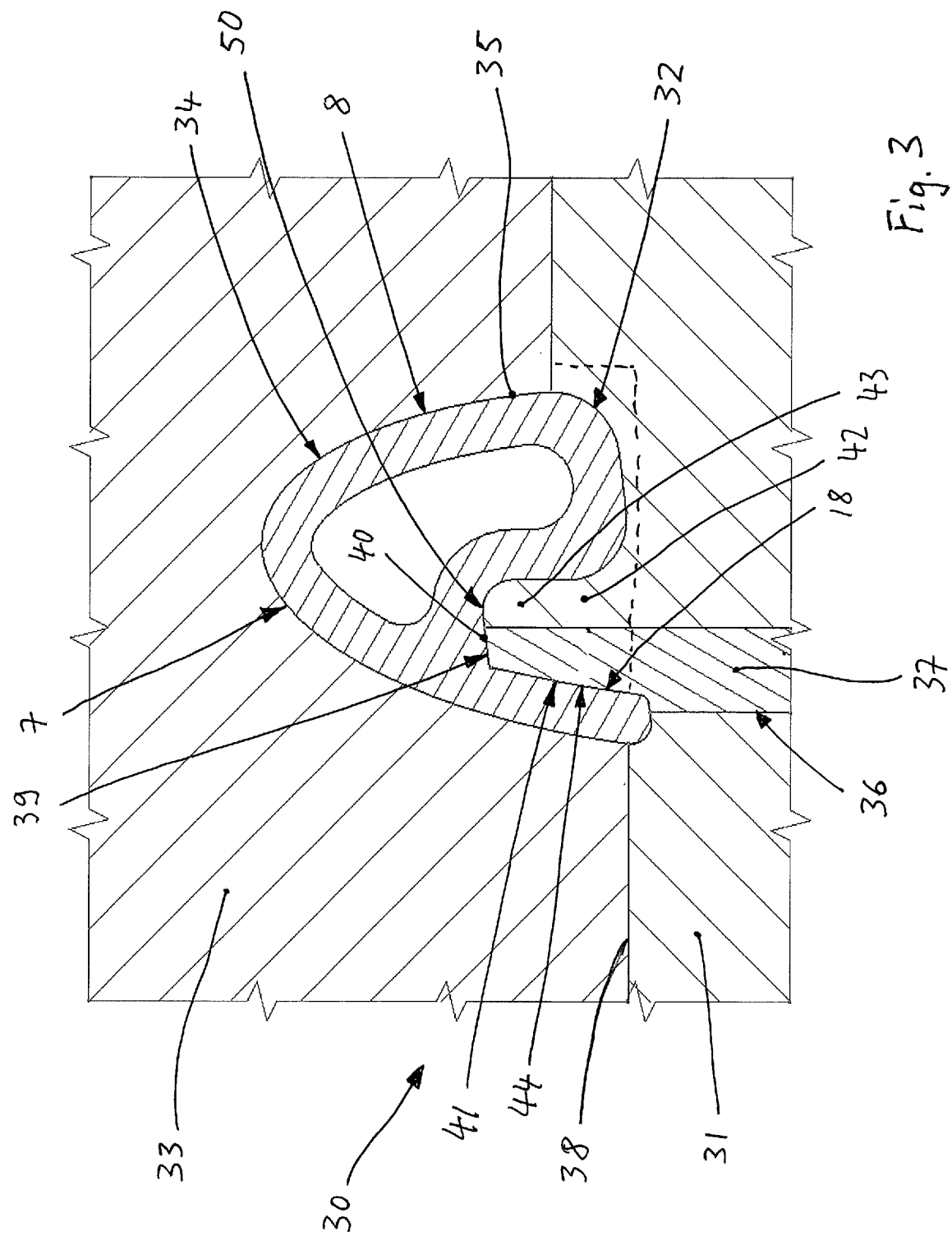
FIG. 3 shows in a cross-sectional view an injection-molding tool with a wind deflector bow molded therein.

An injection-molding tool 30 for producing such a wind deflector bow 7 has a first mold plate 31 with a cavity 32 and a second mold plate 33 with a cavity 34. The two cavities 32 and 34 form a mold cavity 35 for molding the wind deflector bow 7. The lower first mold plate 31 in the view has a plurality of ejector channels 36 (the sectional views of FIGS. 3 and 4 show in each case an ejector channel 36 with an ejector 37 and/or 37'), in each case an ejector 37 extending therethrough. The ejector channels 36 preferably run perpendicular to the parting plane 38 between the two mold plates 31 and 33.

The ejector 37 shown in FIG. 3 is designed and positioned such that, when the tool 30 is closed and the wind deflector profiled element 8 is formed in the mold cavity 35, it bears with an upper front face 39 against the groove base 40 of the groove 15 and with a beveled front side surface 41 against the inclined flat interior 18 of the profile leg 14 of the wind deflector profiled element 8. The ejector 37 in this case only partially fills up the groove 15 over its width, whilst the other part of the groove 15 in the region of the ejector 37 is formed by a mold insert 42 of the lower mold plate 31. The mold insert 42 contains a mold web 43, forming the groove 15 and protruding into the mold cavity 35, and a groove-shaped recess 44 for the ejector 37 in the extension of the ejector channel 36. When the tool 30 is closed the upper front face 39 of the ejector 37 is arranged flush with a mold web front surface 50 which forms the groove base 40 of the groove 15. The mold web 43 in principle molds the groove 15 and extends over the length thereof and/or over the length of the wind deflector profiled element 8.

When the wind deflector profiled element 8 is removed from the mold, when or after the second upper mold plate 33 is lifted off, the ejector 37 travels in a linear manner out of the first lower mold plate 31 and at the same time pushes out the wind deflector profiled element 8 which is also easily released from the ejector 37.

Figure 6:
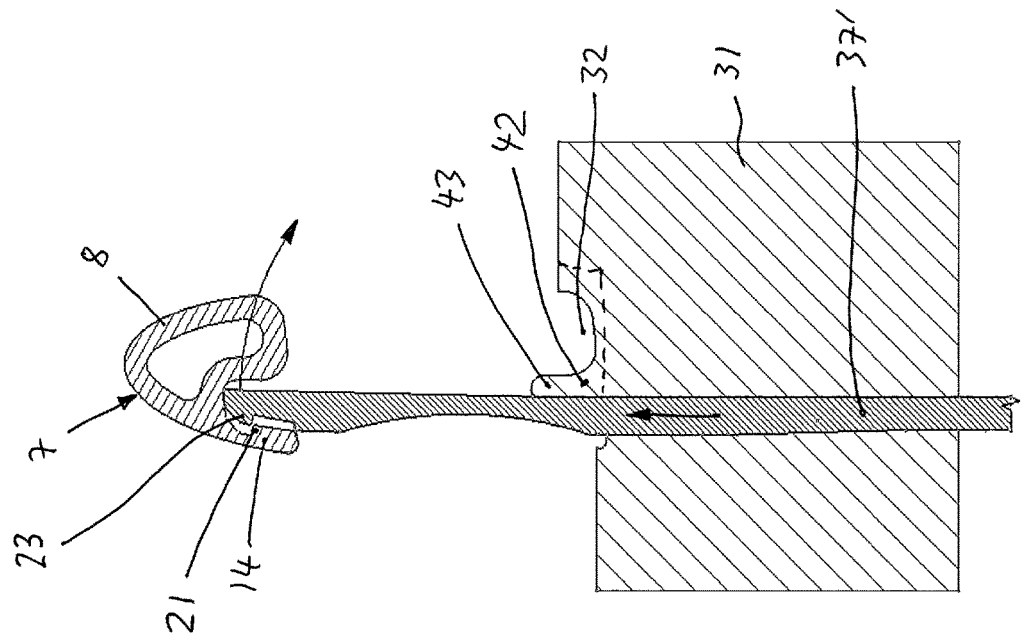
FIG. 6 shows in a cross-sectional view according to FIG. 5 a lower tool half of the injection-molding tool with the resilient ejector in an extended position.
Figure 5:
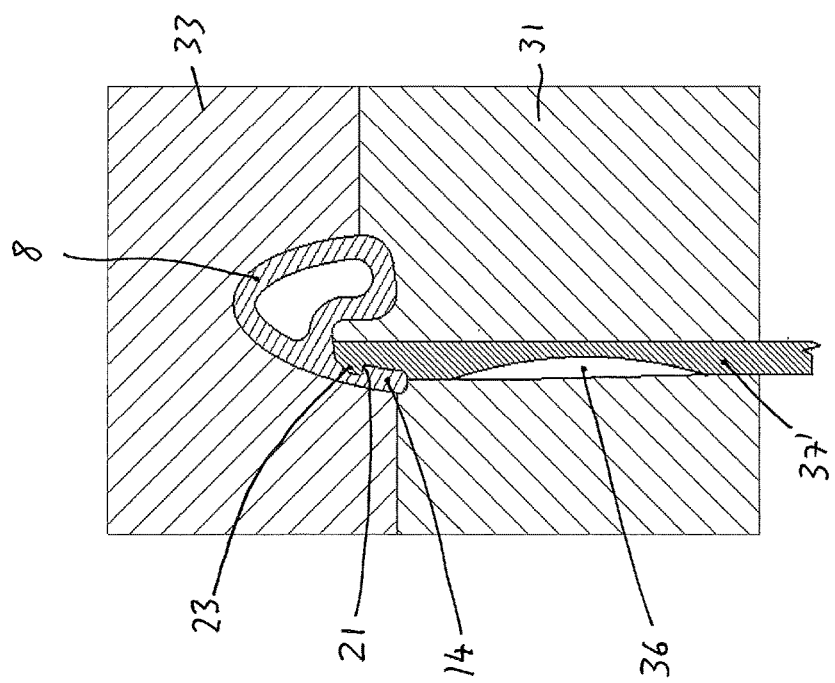
FIG. 5 shows in a cross-sectional view according to FIG. 4 the injection-molding tool with a resilient ejector guided therein.

The ejector 37' shown in FIGS. 4 to 6 is modified relative to the ejector 37 shown in FIG. 3, such that it is a resilient ejector 37' and when the tool 30 is closed and the wind deflector profiled element 8 is formed in the mold cavity 35 it is arranged in the region of a hook portion 21 of the profile leg 14. The front side surface 41 of the ejector 37' is formed as a negative shape of the hook portion 21. When the wind deflector profiled element 8 is removed from the mold, the resiliently pretensioned ejector 37' travels in an arcuate manner out of the lower mold plate 31 and pivots to the side out of the hook portion 21 on the profile leg 14, before it is released from the wind deflector profiled element 8.

Figure 13:
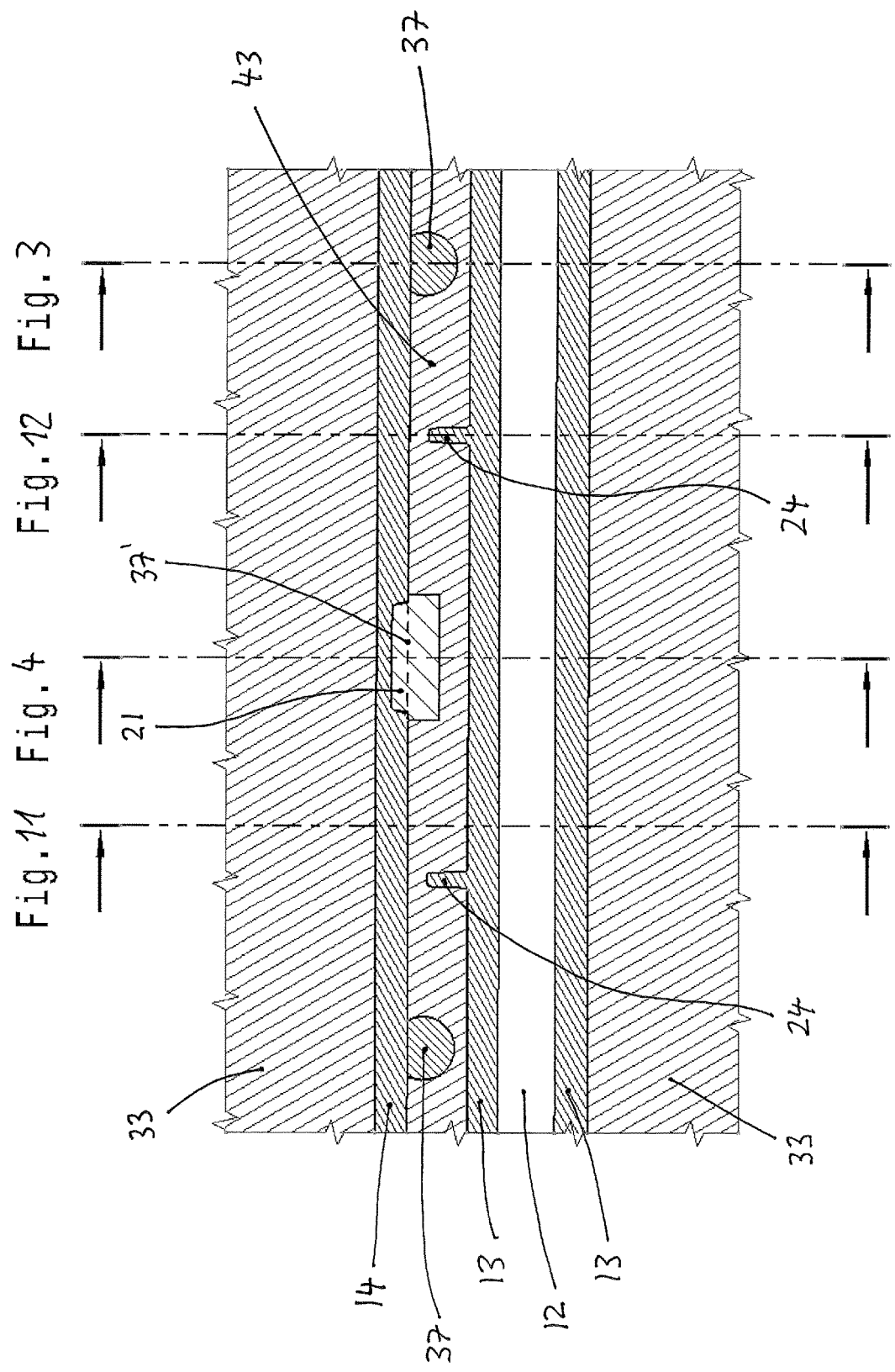
FIG. 13 shows in a further cross-sectional view in a cutting plane shown in FIG. 11, the injection-molding tool with the wind deflector bow molded therein.

Preferably, in each case an ejector 37 and a resilient ejector 37' are arranged alternately over the length of the wind deflector profiled element 8 and assigned to the similarly alternating hook portions 21 and webs 24 in the tool 30 (see FIG. 13).

Figure 12:
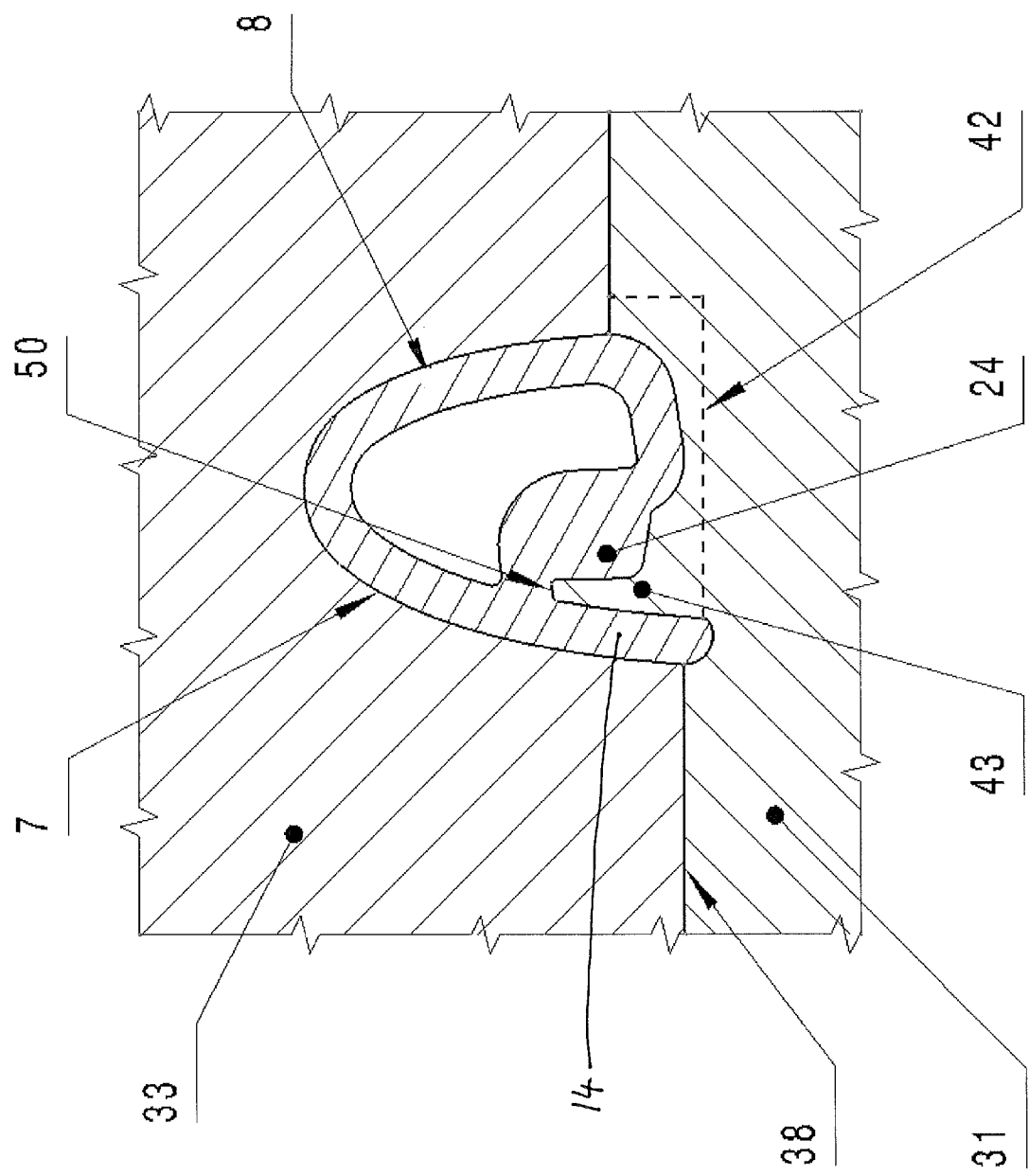
FIG. 12 shows in a cross-sectional view according to a further cutting plane shown in FIG. 13 the injection-molding tool with the wind deflector bow molded therein.

FIGS. 11 and 12 show further sections through the injection-molding tool 30 with the wind deflector bow 8 formed therein. FIG. 13 shows by means of an approximately horizontal section (cutting path shown in FIGS. 4 and 11) through the upper second molding tool 31 of the injection-molding tool 30 the cutting planes of FIGS. 3, 4, 11 and 12.

The mold insert 42 is inserted and fastened as a separate part on the lower first mold plate 31. Alternatively, the lower first mold plate 31 itself may also be formed by a design determining the contour of the cavity.

The injection-molding tool 30 is provided for performing a gas-assisted injection-molding (GIM) or a water-assisted injection-molding method and has a sprue bush 45 containing a sprue opening 51 (see FIGS. 9 and 10) on which an injection needle 46 is placed when the tool 30 is closed and by which plastic molding material is initially injected as melt 47 into a sprue channel or directly into the mold cavity 35 (see FIG. 9). Subsequently the pressure medium 48, for example gas or water, is injected via the injection needle 46. At the same time the hollow chamber 12 is formed in the wind deflector profiled element 8 of the wind deflector bow 7. In each case a sprue bush 45 is arranged on the injection-molding tool 30 in the region of each of the two deployment arms 9. The melt 47 which is injected at the side of the mold cavity 35 flows through the elongated mold cavity 35 according to the shape of the wind deflector profiled element 8. The ejectors 37, 37' protruding into the mold cavity 35 form only minimal flow resistance, due to their slim design on the front face. As a result, a high-quality injection-molded part is achieved by a substantially uninterrupted inflow of the plastic molding material.

The wind deflector bow 7 produced by the gas-assisted injection-molding method (GIM) or the water-assisted injection-molding method has a high degree of stiffness and torsional strength. Additional reinforcements to be molded-on or attached are not required. The deployment arms 9 may be located outside the region which is formed by the gas-assisted injection-molding method or the water-assisted injection-molding method. The deployment arms 9 may optionally be formed with reinforcements 49. If required, the lower face of the deployment arm 9 may be covered with a panel which also covers the sprue region 29.

The attachment of the add-on part 17 is carried out simply by insertion into the groove 15 and latching to the hook portion 21. A screw connection or other fastening process is not required.

The individual features which are disclosed in the description and with reference to the exemplary embodiments and the figures may be combined in any technically expedient arrangements and designs with the respective subject of the invention in its general form.

The invention claimed is:

1. An openable vehicle roof, comprising:
    a wind deflector device, which contains a wind deflector bow, which is produced from plastic material and has a central wind deflector profiled element having lateral deployment arms,
    wherein at least the wind deflector profiled element has a profile leg, which delimits a groove, which is formed on the wind deflector profiled element and is open at the bottom and runs longitudinally,
    wherein the profile leg has, on an interior thereof facing the groove, a molded-on or attached fastening apparatus for an add-on part, and
    wherein a plurality of webs for fixing an add-on part, which is to be attached or is attached to the fastening apparatus, are formed in the groove or on a groove base.

2. The vehicle roof as claimed in claim 1, wherein the fastening apparatus has at least one fastening element for forming an undercut engagement with the add-on part.

3. The vehicle roof as claimed in claim 1, wherein the profile leg is arranged on the wind deflector profiled element on a front face or air-conducting face and delimits the groove on the front face.

4. The vehicle roof as claimed in claim 1, wherein the wind deflector profiled element is formed as a hollow chamber profile with the profile leg molded thereon.

5. An openable vehicle roof, comprising:
    a wind deflector device, which contains a wind deflector bow, which is produced from plastic material and has a central wind deflector profiled element having lateral deployment arms,
    wherein at least the wind deflector profiled element has a profile leg, which delimits a groove, which is formed on the wind deflector profiled element and is open at the bottom and runs longitudinally,
    wherein the profile leg has, on an interior thereof facing the groove, a molded-on or attached fastening apparatus for an add-on part,
    wherein each of the two lateral deployment arms has a sprue region, and
    wherein the wind deflector profiled element is sprue free.

6. The vehicle roof as claimed in claim 1, wherein the fastening apparatus or fastening elements of the fastening apparatus comprises and/or comprise hook portions by which latching lugs of the add-on part form undercut engagements for fixing the add-on part.

7. The vehicle roof as claimed in claim 6, wherein hook portions are formed alternately with webs on the wind deflector profiled element.

8. The vehicle roof as claimed in claim 1, wherein the add-on part comprises a wind deflector element or a wind deflector mesh or a weatherstrip which bears a wind deflector element or a wind deflector mesh.

* * * * *